United States Patent
Terry et al.

(10) Patent No.: US 9,633,326 B2
(45) Date of Patent: Apr. 25, 2017

(54) LOAD DISTRIBUTION AND CONSOLIDATION TRACKING SYSTEM

(71) Applicant: Smart Catch LLC, Palo Alto, CA (US)

(72) Inventors: Robert Mark Terry, Palo Alto, CA (US); Ahmed Alhafidh, Champaign, IL (US); Anastassia Kolosova, Champaign, IL (US); Corey Ryan Peet, Pacific Grove, CA (US)

(73) Assignee: Smart Catch Inc., Palo Alto, CA (US)

( * ) Notice: Subject to any disclaimer, the term of this patent is extended or adjusted under 35 U.S.C. 154(b) by 131 days.

(21) Appl. No.: 14/735,799

(22) Filed: Jun. 10, 2015

(65) Prior Publication Data

US 2016/0364689 A1  Dec. 15, 2016

(51) Int. Cl.
*H04W 88/16* (2009.01)
*H04W 60/00* (2009.01)
*G06Q 10/08* (2012.01)
*H04W 76/02* (2009.01)
*H04L 29/06* (2006.01)

(52) U.S. Cl.
CPC ..... *G06Q 10/0833* (2013.01); *H04L 65/1076* (2013.01); *H04W 76/021* (2013.01)

(58) Field of Classification Search
None
See application file for complete search history.

(56) References Cited

U.S. PATENT DOCUMENTS

| | | | |
|---|---|---|---|
| 7,218,227 B2 | 5/2007 | Davis et al. | |
| 7,734,658 B2 | 6/2010 | Parkinson et al. | |
| 7,895,131 B2 | 2/2011 | Kraft | |
| 8,149,090 B2 | 4/2012 | Hall et al. | |
| 8,666,936 B2 | 3/2014 | Wallace | |
| 8,749,377 B2 | 6/2014 | Lane | |
| 8,810,406 B2 | 8/2014 | Sell | |
| 2004/0024644 A1* | 2/2004 | Gui | G06Q 10/08 705/22 |
| 2005/0259658 A1* | 11/2005 | Logan | H04L 67/306 370/392 |
| 2008/0189420 A1* | 8/2008 | Herrod | G06K 7/10326 709/227 |
| 2009/0040041 A1 | 2/2009 | Janetis et al. | |
| 2009/0303045 A1* | 12/2009 | Winter | G06Q 10/08 340/568.1 |

(Continued)

*Primary Examiner* — Chi H Pham
*Assistant Examiner* — Soon-Dong D Hyun
(74) *Attorney, Agent, or Firm* — Intellent Patents LLC; Anastassia Kolosova; Ahmed Alhafidh

(57) ABSTRACT

Through various embodiments, a traceability system may comprise a first tracking device configured to receive a pre-generated session identification number, wherein the pre-generated session identification number is assigned to a first load and a MAC address of the device. The device is further configured to initialize one or more environmental sensors of the device and generate, through the one or more environmental sensors, environmental data pertaining to one or more factors of an environment surrounding the device. The device is additionally configured to execute a propagation query to generate a second session identification number adapted from the pre-generated session identification number, the second session identification number being related to a second load derived from the first load.

34 Claims, 8 Drawing Sheets

(56) References Cited

U.S. PATENT DOCUMENTS

| | | |
|---|---|---|
| 2011/0029413 A1 | 2/2011 | Ben-Tzur et al. |
| 2013/0016636 A1 | 1/2013 | Berger et al. |
| 2013/0185104 A1 | 7/2013 | Klavins |
| 2014/0156472 A1* | 6/2014 | Stuntebeck .......... G06Q 10/087 |
| | | 705/28 |
| 2014/0174568 A1 | 6/2014 | Hershberger et al. |
| 2015/0034720 A1* | 2/2015 | Minogue .............. G06Q 10/083 |
| | | 235/385 |

* cited by examiner

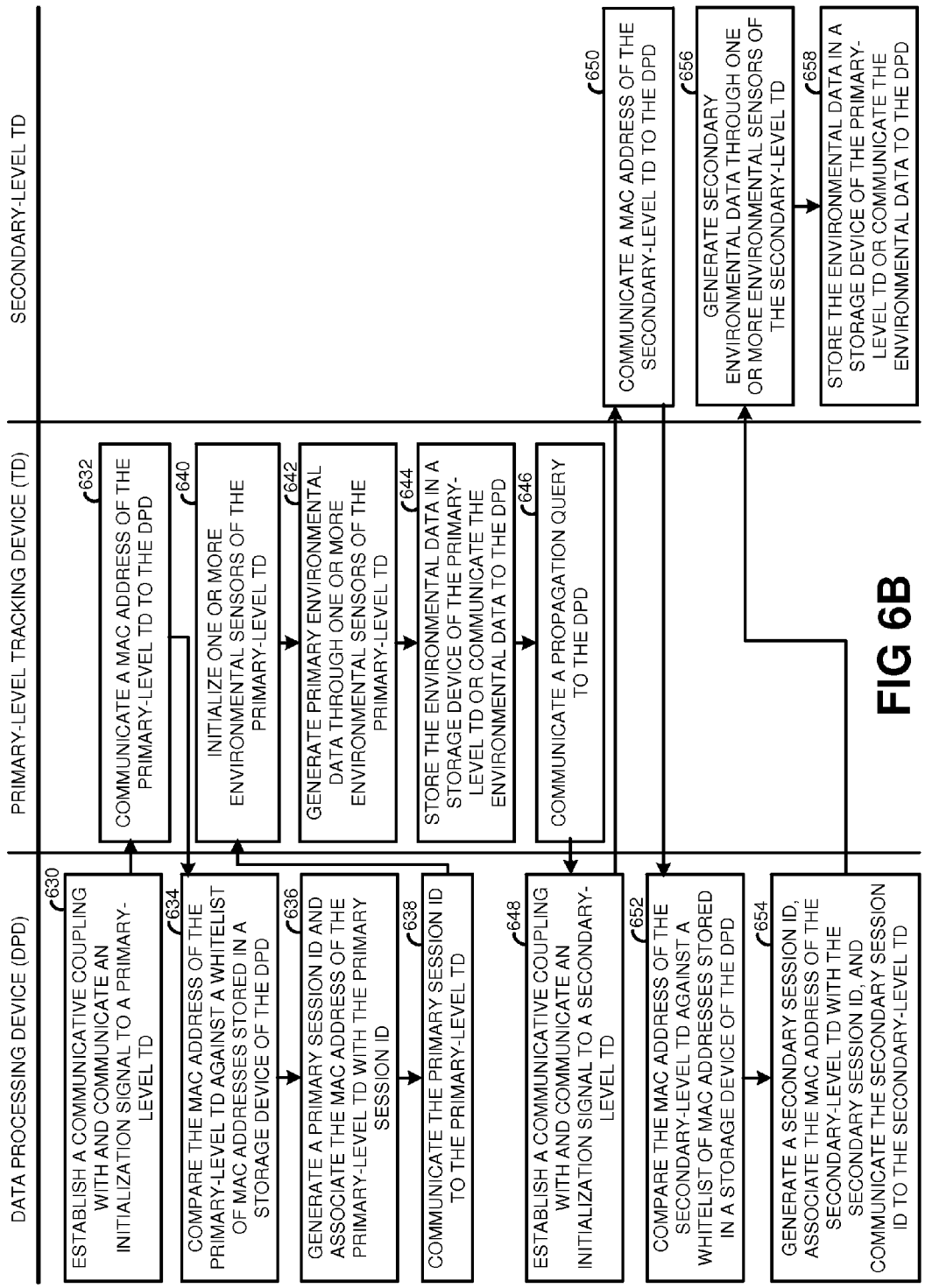

LOAD DISTRIBUTION AND CONSOLIDATION TRACKING SYSTEM

FIELD OF TECHNOLOGY

This disclosure relates generally to data processing devices and, more particularly, to a method, a device and/or a system of tracking data associated with distribution and consolidation of a shipment.

BACKGROUND

The seafood industry and supply chain lack information indicating the sustainability and perishability of associated products. Additionally, seafood shipping units are often split and consolidated, complicating origin and perishability tracking of each individual unit. Stakeholders want to know what happens to seafood, from ship or aquaculture pond to supermarket shelf. Consumers also want to know where the seafood came from and how fresh it is. Processors and distributors also care about sustainability, conditions during shipping, and any potential product diversion or switching. Other stakeholders, like customs authorities and transporters, need accurate, high-resolution information on the seafood to verify the product's authenticity and expedite customs proceedings.

The current systems in place provide only limited information and are easily tampered with and cumbersome to operate. Some systems even require users to manually gather and enter data. Seafood supply chain tracking systems only provide part of the information and do not allow all stakeholders to easily access relevant info as the systems do not currently possess a means for fully automated, multi-dimensional shore-to-shelf traceability. Current systems include bar code, QR code and RFID tracking systems, which allow shipments to be passively tracked by separate reader devices or agents, and usually do not process, analyze or store data. Bar code or QR code tracking systems require the printed codes to be read by an optical reader (OR) device in order to spatially link the labeled shipment with the reader. Furthermore, such systems do not collect vital environmental data, such as temperature, light, or physical disruption. While RFID tracking systems may dispense with the necessity of individually scanning items using readers and utilize RF gates instead, the RFID chips often provide only spatial information. Even systems of RFID tags associated with temperature or humidity sensors can only log and/or transmit small amounts of data at very low bandwidth, and require an accompanying network interface to provide access to wireless networks to be set up in order for such systems to work. Such systems are limited in the breadth and depth of data that they can collect (i.e. due to limited memory), and further limited by the investment inherent in wireless network setup and by the structural necessity of passing through reader gates. Furthermore, even when some form of supply chain tracking system is in place, multiple stakeholders and end consumers cannot easily access relevant, in-depth information.

Fishermen and transporters may lack technological capability and may not have the time or attention to spare to correctly install, set up or activate tracking systems or devices. One mistake may render an entire set of data inaccurate or incomplete. Especially when accurate and up-to-date data are needed to cross borders or ensure compliance with sustainability guidelines, such mistakes could delay processing or require inspectors to personally check the product, incurring thousands of dollars in losses due to spoilage or fees for inspectors.

The lack of easily obtainable and accessible traceability information linking fishermen, transporters, processors, distributors and end consumers limits the ability of all involved to make informed choices, and necessitates time-consuming and expensive regulation. Without detailed transportation quality information, fishermen and distributors may not be able to choose the best transportation service. Without automated real-time environmental data reporting, processors or distributors could only use passive tracker logs or manifests to document unsafe product rather than to actively prevent product shrinkage. Furthermore, without broad, automated data collection, it is difficult for seafood producers, processors and distributors to establish credibility in regards to food safety or to resolve food safety issues. Without the same broad, high-resolution data, auditing agencies cannot efficiently determine the degree of sustainability in seafood production and within the seafood product supply chain. Without such data, shipments must often wait at national borders for safety inspections, negatively affecting the freshness, quality and value of the product. Were such data available, border crossings could be expedited with minimal danger to consumers, reducing both inspector fees and the risk of product spoilage. And finally, without access to detailed origin and supply chain environmental information, end consumers cannot make fully informed purchasing choices, which leads to further wasted resources.

SUMMARY

Disclosed are a method, a device and systems of tracking data associated with distribution and consolidation of a shipment.

In one aspect, a device for tracking a first load may comprise a memory comprising a series of instructions. When executed by a processor of the device, the instructions cause the device to receive a pre-generated session identification number, wherein the pre-generated session identification number is assigned to the first load and a MAC address of the device. The instructions further cause the device to initialize one or more environmental sensors of the device. The device then generates, through the one or more environmental sensors, environmental data pertaining to one or more factors of an environment surrounding the device. The device further executes a propagation query to generate a second session identification number adapted from the pre-generated session identification number to indicate a divisional relationship with the pre-generated session identification number, the second session identification number being related to a second load derived from the first load.

In another aspect, a method of tracking a first load involves receiving, through a processor of a device, a pre-generated session identification number, the pre-generated session identification number being related to the first load and a MAC address of the device. The method further involves, upon receiving the pre-generated session identification number, initializing, through the processor of the device, one or more environmental sensors of the device. The method additionally involves generating, through the one or more environmental sensors, environmental data pertaining to one or more factors of an environment surrounding the device. Further yet, the method involves executing a propagation query, through the processor of the device, to generate a second session identification number adapted from the pre-generated session identification number to indicate a divisional relationship with the pre-generated session identification number, the second session identification number being related to a second load derived from the first load.

In yet another aspect, a system comprises a first device tracking a first load, the first device comprising a memory. The system also comprises a second device tracking a second load derived from a first load wherein the second device comprises a memory. The memory of the first device stores instructions that when executed by a processor of the first device cause the first device to: receive a pre-generated first session identification number, the pre-generated first session identification number being related to the first load and a MAC address of the first device; upon receiving the pre-generated first session identification number, initialize one or more environmental sensors of the first device; generate, through the one or more environmental sensors, environmental data pertaining to one or more factors of an environment surrounding the first device; store the environmental data in the memory of the first device; and execute a propagation query to generate a second session identification number adapted from the pre-generated first session identification number to indicate a divisional relationship with the pre-generated first session identification number, the second session identification number being related to the second load.

In a further aspect, a system comprises a server comprising a memory storing a whitelist comprising one or more MAC addresses. The system further comprises a first device communicatively coupled to the server, the first device tracking a first load and comprising a memory, the memory comprising instructions. When executed by a processor of the first device, the instructions cause the first device to: communicate a MAC address of the first device to the server; receive a first session identification number from the server, wherein the first session identification number is generated by the server upon comparing, through a processor of the server, the MAC address of the first device against one or more MAC addresses of the whitelist and wherein the first session identification number is assigned to the first load and the MAC address of the first device; initialize one or more environmental sensors of the first device; generate, through the one or more environmental sensors of the first device, environmental data pertaining to one or more factors of an environment surrounding the first device; and communicate a propagation query to the server that when executed by the server causes the server to generate a second session identification number adapted from the first session identification number to indicate a divisional relationship with the first session identification number, the second session identification number being assigned to a second load derived from the first load.

In yet a further aspect, a system comprises a data processing device comprising a memory. The system also comprises a tracking device communicatively coupled to the data processing device, the tracking device tracking a first load and comprising a memory, the memory comprising instructions. When executed by a processor of the tracking device, the instructions cause the tracking device to receive an initialization signal from the data processing device. The tracking device also communicates a MAC address of the tracking device to the data processing device. The tracking device further receives a session identification number from the data processing device, wherein the session identification number is generated by the data processing device and communicated to the tracking device upon comparing, through a processor of the data processing device, the MAC address of the tracking device against one or more MAC addresses aggregated in a whitelist stored in the memory of the data processing device. The session identification number is related to the first load and the MAC address of the tracking device. The tracking device also initializes one or more environmental sensors of the tracking device. Furthermore, the tracking device generates, through the one or more environmental sensors, environmental data pertaining to one or more factors of an environment surrounding the tracking device. The tracking device also communicates a propagation query to the data processing device that when executed by the data processing device causes the data processing device to generate a second session identification number adapted from the session identification number to indicate a divisional relationship with the session identification number, the second session identification number being related to a second load derived from the first load.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 6B is a segmented flowchart illustrating an embodiment of the tracking system of FIG. 1 comprising two or more tracking devices and a data processing device, according to one or more embodiments.

Other features of the present embodiments will be apparent from the accompanying drawings and from the detailed description that follows.

DETAILED DESCRIPTION

Example embodiments, as described below, may be used to provide a method, a system and/or a device of tracking data associated with distribution and consolidation of a shipment.

Disclosed is a system that facilitates end-to-end traceability of a load, where the load may be subdivided. We define "traceability" as the collection and aggregation of data regarding parameters relevant to the transport of goods, for example: identifying information, location over time, state of disruption and environmental data. The system may hereinafter be referred to as "traceability system" or "tracking system".

Figure 1:
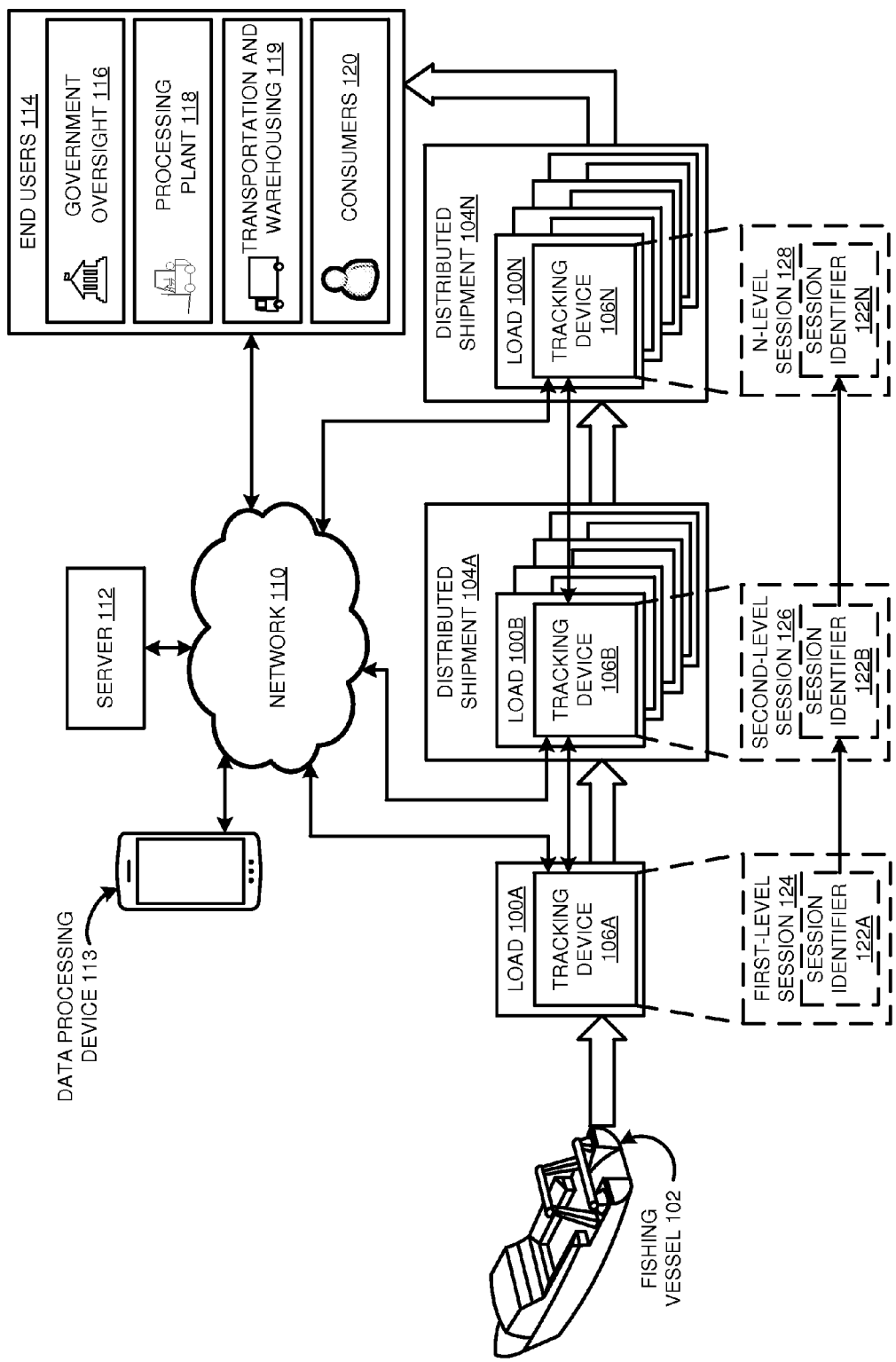
FIG. 1 is an illustration of a tracking system, according to one or more embodiments.

Reference is now made to FIG. 1, a schematic diagram of a tracking system. In one embodiment, a load 100 may comprise a container of goods. Possible types of goods include perishable goods, such as seafood or vegetables, and nonperishable goods, such as dry goods or machine parts. For example, a fishing vessel 102 may unload a load of seafood onto a dock. In one embodiment, the load may be a divisible load. Once the load 100A is divided as a distributed shipment 104A, each division of the load 100A may be considered a load 100B. The load 100B may be divided further as a distributed shipment 104N comprising a load 100N. Loads 100A-N may be subsequently consolidated (i.e. separated for shipment and consolidated after reaching shipment destination). In yet another embodiment, a load may comprise an indivisible load.

Traceability involves collecting data regarding a load throughout the progress of the load through a supply chain or a value chain. Aggregating the collected data permits any party with access to the data to easily access information about the load's condition during one or more segments of the supply chain or value chain. Traceability of the load 100A may be accomplished using a tracking device (TD) 106A, which may be placed near or in the load 100A to track the load 100A. Each TD functions as a single data-gathering unit within the traceability system of FIG. 1. Used in concert, the TDs may provide multi-faceted information regarding a load and its parts as the load is divided and consolidated throughout the shipment, processing and packaging process.

The TD 106A may record environmental data and store the data generated by the TD 106A. The data may then be reviewable by any number of end users 114 with permitted access to the data. The end users 114 may comprise at least one of a government oversight 116, a processing plant 118, transportation and warehousing 119, or consumers 120.

The types of data collected may comprise temperature, humidity, exposure to light, GPS location over time, TD tampering, and other types of data. Other types of data may be collected and are within the scope of the exemplary embodiments described herein. The data from tracking devices 106A-N may be aggregated in the memory of a data processing device 113 or communicated through a network 110 to a server 112 to be stored in the server 112.

Each of the TDs 106A-N is associated with a MAC address and also associated with a session identifier (session ID) 122A-N. Additionally, the data processing device 113 may be associated with the session ID 122A-N.

In one embodiment, the TD 106B may receive a session ID 122B from a memory of the TD 106A. In another embodiment, the TD 106B may receive the session ID 122B from the server 112 or a DPD 113.

Each of the session IDs 122A-N may be associated with a part of a divided load, a stage in the transport of a single load, or a load having any other divisional relationship with a prior load.

When a load associated with a session ID is divided, the parts of the divided load may become associated with session IDs adapted from the session ID of the original load. Such relationships between session IDs may be maintained throughout further divisions. For example, if the load 100B (a part of the load 100A) is further divided in a load 100N, the session ID 122N (associated with load 100N) may be adapted from the session ID 122B which in turn was adapted from the session ID 122A of the load 100A. Thus, the session IDs 122A-N may reflect both the divisions and the original relationships between the parts of a load.

In another embodiment, the TD 106A may establish a secure connection with a server 112. To establish the secure connection, the TD 106A and the server 112 may perform an authentication procedure. In one embodiment of an authentication procedure, the TD 106A may communicate its MAC address to the server 112, the server 112 then comparing the MAC address of the TD 106A against one or more MAC addresses aggregated in a whitelist stored in a memory of the server 112. After authentication, the TD 106A may proceed to communicate environmental data to the server 112.

"Propagation" is defined as the initialization of a second recording session related to a first recording session, the second recording session having a session ID adapted from the session ID of the first recording session. The first recording session may also be called the "upper-level session" (or the first-level session 124) associated with an "upper-level session ID," (the session ID 122A) and the second recording session may also be called the "lower-level session" (or the second-level session 126) associated with a "lower-level session ID" (the session ID 122B). The lower-level session in one propagation event may later be the upper-level session in a later propagation event, just as a lower-level session ID may be adapted during a later propagation event into a further lower-level session ID. Furthermore, "lower-level" and "upper-level" are only relative terms, and do not imply a strict hierarchical relationship.

Thus, the session ID 122B will indicate a divisional relationship with the session ID 122A, indicating that the first-level session 124 and the second-level session 126, and the loads 100A and 100B associated with them, respectively, are related, but not necessarily identical.

In one embodiment, the second-level session 126 may be associated with the load 100B, which may be a part of the load 100A associated with the first-level session 124. In another embodiment, the second-level session 126 may be associated with a different step in a supply chain or value chain of the load 100A associated with the first-level session 124.

The session ID 122B may be adapted in multiple ways. In one embodiment, alphanumeric characters may be appended to the session ID 122A to create the session ID 122B. For example, if the session ID 122A is "00001", the session ID 122B (or other session IDs at the same level in the hierarchy) may include "00001A", "00001B", etc. In another embodiment, characters within the session ID 122A may be altered in a sequential manner. For example, if the session ID 122A is "00001B", the associated session ID 122B may include "00001C". In another embodiment, the session ID 122B may not share overt characteristics with the session ID 122A. Other session ID propagation labeling schemes may exist and are within the scope of the exemplary embodiments described herein. For example, the propagation scheme may adhere to an algorithm or cipher in order to mask associations between loads at different levels of the hierarchy. The algorithm may be stored in the server 112 or in the data processing device 113. Only select devices and/or users of the traceability system may be able to access the algorithm in order to determine the masked associations between the loads.

Figure 2:
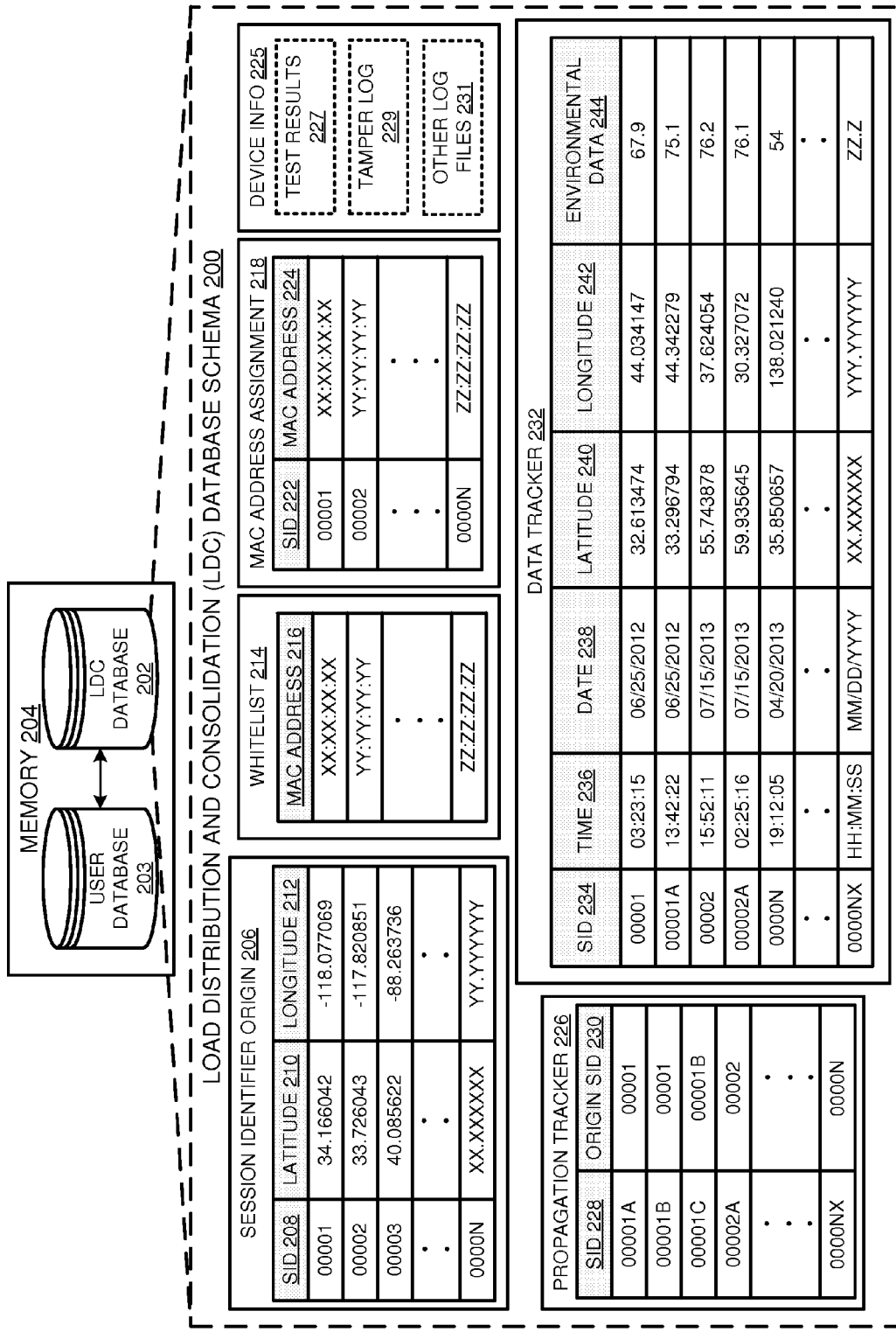
FIG. 2 is a database schema illustrating an organization of data gathered by the tracking system of FIG. 1, according to one or more embodiments.

Reference is now made to FIG. 2, which illustrates a load distribution and consolidation (LDC) database schema 200 of an LDC database 202 stored in a memory 204 of the server 112 of FIG. 1. The LDC database schema 200 comprises one or more relation tables, each of which may comprise one or more fields; the one or more fields may be primary and/or unique. When session IDs are created, their location of origin may be tracked in the LDC database 202 in a relation table: session identifier origin 206. Session identifier origin 206 may comprise a unique first field, SID 208 which comprises one or more unique session IDs. Session identifier origin 206 may additionally comprise a second field, latitude 210, and a third field, longitude 212. Latitude 210 and longitude 212 may store geographical coordinates of a TD having an associated SID 208. For example, the "00001" entry in SID 208 may have a latitude 210 at 34.166042 and a longitude 212 at −118.077069.

The LDC database schema 200 may also comprise another relation table: whitelist 214, which may comprise a single field, MAC address 216. MAC address 216 may comprise one or more unique MAC addresses. Furthermore, the LDC database schema 200 may comprise yet another relation table: MAC address assignment 218. MAC address assignment 218 may comprise a unique first field, SID 222 which may comprise one or more unique session IDs. MAC address assignment 218 may comprise a second field, MAC address 224, which may store the MAC addresses of one or more TDs associated with corresponding session IDs in SID 222. MAC address assignment 218 may also store MAC addresses of one or more data processing device associated with one or more session IDs from SID 222. In the case of more than one MAC address assignment to a single session ID in SID 222, MAC address assignment 218 may comprise further MAC address fields, thus allowing SID 222 to remain unique.

Specific information for specific TDs may be stored in device info 225. Device info 225 may be a relation table, a repository, or other data structure. Device info 225 may comprise test results 227 (e.g. from self-calibration) as well as tamper log 229 and other log files 231. The tamper log 229 may track one or more events in which an associated TD was tampered with (e.g. pried open, shaken vigorously, broken during transit, etc.).

The relationship between session IDs (e.g. session ID 122A and 122B) may be stored in a relation table: propagation tracker 226. Propagation tracker 226 may comprise a unique first field SID 228 of one or more unique session IDs; propagation tracker 226 may comprise a second field origin SID 228 having one or more origin session IDs, propagation tracker 226 thus relating the one or more unique session IDs of the first field to the corresponding one or more origin SIDs of the second field. Propagation tracker 226 may relate further session IDs with a single origin SID. For example, origin SID 00001 may be related to session IDs 00001A, 00001B, 00001C and so on. In this way, the SID 228 field remains unique.

Sensor data associated with a certain session ID may be stored in another relation table, data tracker 232. Data tracker 232 may comprise a first field SID 234 comprising one or more session IDs; data tracker 232 may comprise one or more other fields having sensor data. For example, the relation table may comprise another field, time 236, having a timestamp for each entry (e.g. time of initialization, time of routine data gathering, etc.); data tracker 232 may comprise further fields having data comprising date 238, latitude 240, longitude 242, environmental data 244 (e.g. temperature, as shown in FIG. 2), and other sensor data. data tracker 232 would thus relate the one or more session IDs of SID 234 to the corresponding sensor data of the one or more other fields. Other data types may also be aggregated in and tracked by data tracker 232 and are within the scope of the exemplary embodiment described herein.

The propagation process comprises the execution of a propagation query, the generation of a lower-level session ID, the communication of the lower-level session ID to a second tracking device, the assignment of the lower-level session ID to a second recording session, and the initialization of the second recording session comprising initialization of data generation through one or more sensors of the second tracking device.

In one embodiment, a TD may execute a propagation query. Such a process may be referred to as a "propagation event." The propagation query is an instruction that may be executed in response to one or more of: a physical manipulation of controls, a remote signal, or a sensor input reaching a predetermined threshold. The execution of the propagation query generates a lower-level session ID adapted from an upper-level session ID. As described above, in an embodiment wherein the upper-level session ID is associated with a first recording session of a first load, the lower-level session ID may then be associated with a second recording session of a second load related to the first load (i.e. a further step in the tracking of the first load). As such, sensor data associated with the second recording session may be further associated with the first recording session. For example, the sensor data may be stored in a database on a server, and the association may be accomplished by means of relation tables as described in FIG. 2 (i.e. in propagation tracker 226 and data tracker 232). In another example, the data may be stored locally on a TD or a DPD, and the associated data may be read and displayed by an application executed by the DPD.

The propagation event may be triggered in multiple ways by any device. In one embodiment, the propagation event may be triggered by the manipulation of physical controls on the TD (e.g. buttons pressed, prolonged agitation, etc.). In another embodiment, the propagation event may be triggered by a signal from a DPD communicatively coupled with the TD (e.g. through NFC, Bluetooth, wired coupling, etc.). In yet another embodiment, the propagation event may be triggered by a second TD communicatively coupled with the first TD (e.g. through NFC, Bluetooth, wired coupling, etc.). In yet another embodiment, the propagation event may be triggered by a signal from a remote server. Other methods of triggering the propagation event may exist and are within the scope of the exemplary embodiments described herein.

Figure 3:
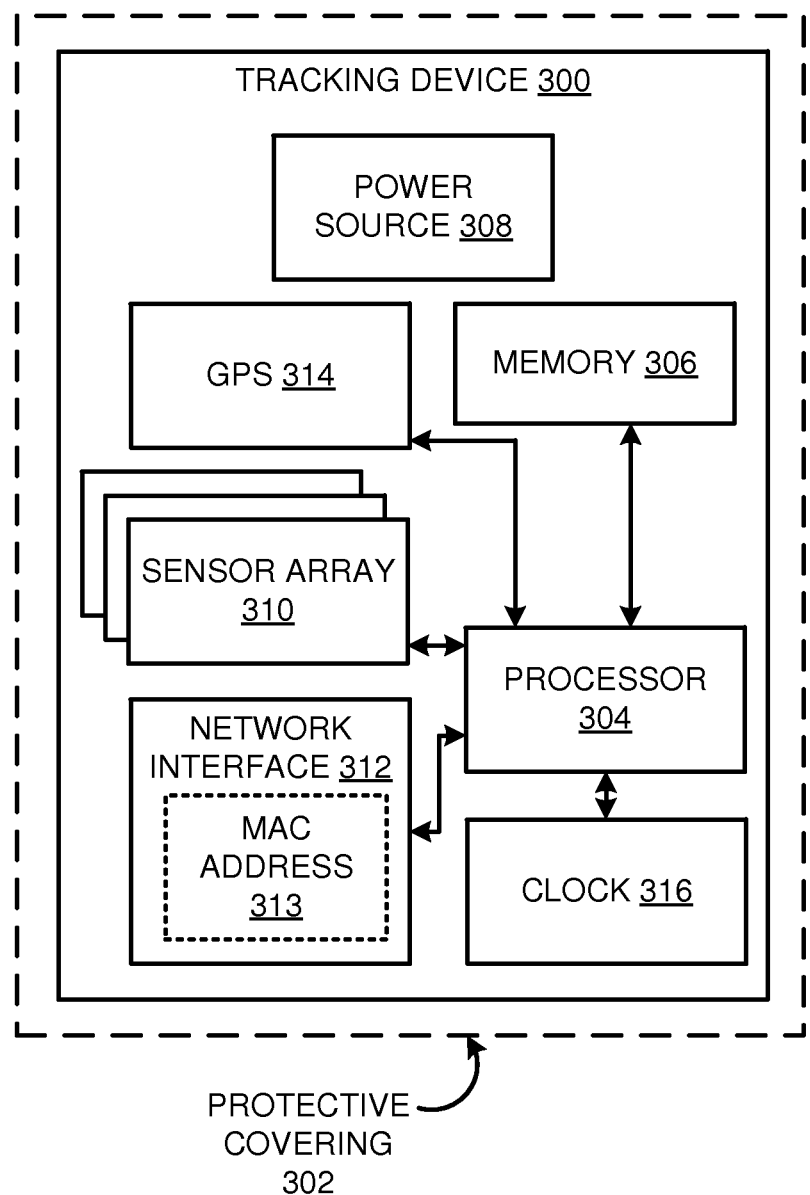
FIG. 3 is a component view of a tracking device of the tracking system of FIG. 1, according to one or more embodiments.

Reference is now made to FIG. 3, which illustrates a component view of a tracking device 300 of the tracking system of FIG. 1. The TD 300 may comprise a protective covering 302, a processor 304, a memory 306, a power source 308, a sensor array 310, a network interface 312 having as associated MAC address 313, a GPS 314, and a clock 316.

The protective covering 302 may be waterproof and may be removable in order to gain access to the components of the TD 300. The TD 300 may also have comprise means of detecting tampering of the TD 300.

The memory 306 may be communicatively coupled to the processor 304, and may comprise at least one of a volatile memory and a non-volatile memory. Other forms and functions of memory are within the scope of the exemplary embodiments described herein.

The sensor array 310 is communicatively coupled to the processor 304, and may comprise at least one sensor. A sensor may be any device that measures a sensory input (e.g.

video, humidity, pressure, temperature, physical strain, infrared light, genomic information, etc.) and records and/or subsequently communicates the sensory input to a processor. Other forms and functions of sensors may be incorporated into the TD 300 and are within the scope of the exemplary embodiments.

The power source 308 may comprise a charging system. In another embodiment, the power source 308 may further comprise a backup battery. In another embodiment, the power source 308 may be a solar panel. Other forms and functions of power sources and charging systems may be incorporated into the TD 300 and are within the scope of the exemplary embodiments.

In one embodiment, the TD 300 may further comprise an IO port (not shown). In another embodiment, the TD 300 may further comprise a transceiver (not shown).

Alternate embodiments of the TD 300 are contemplated to adapt the TD 300 to tracking different varieties of loads in different conditions. The TD 300 may comprise one or more physical buttons which may allow triggering of a propagation event or initialization and/or termination of recording sessions of the TD 300. The physical buttons may further allow information to be saved, discarded, or communicated to a second device. The TD 300 may comprise a Liquid Crystal Display (LCD) screen or any other type of display which may allow the TD 300 to display information regarding recording sessions, sensors, communication with other devices, or other information. In one embodiment, the buttons and display may be used in concert to allow the TD 300 to be securely initialized by means of a password or a code. The TD 300 may further comprise an antenna on the transceiver to facilitate communication with other devices.

Alternate protective coverings for the TD are contemplated to adapt the TD to tracing different varieties of loads in different conditions. In one embodiment, the protective covering 302 may comprise a waterproof fabric with a protective pocket for electrical components. Such a protective covering 302 may further comprise strain gauge sensors integrated into the fabric to measure variations in movement. In another embodiment, the protective covering 302 may comprise a rubber covering structured to resemble a fish. Such a covering may allow the TD 300 to blend in with a load of fish and collect data more ubiquitously. The network interface 312 may be a wireless communication interface (e.g. WiFi, Bluetooth, etc.) or a wired communication interface (e.g. Ethernet port) or a cell communication interface (e.g. GSM, CDMA, etc.) and may comprise a unique MAC address 313. The network interface 312 may enable the TD 300 to communicatively couple to other devices and to a network (e.g. a local area network, a wide area network, a personal area network, etc.). The clock 316 may be a real-time clock that may operate independently of the power source 308.

Figure 4:
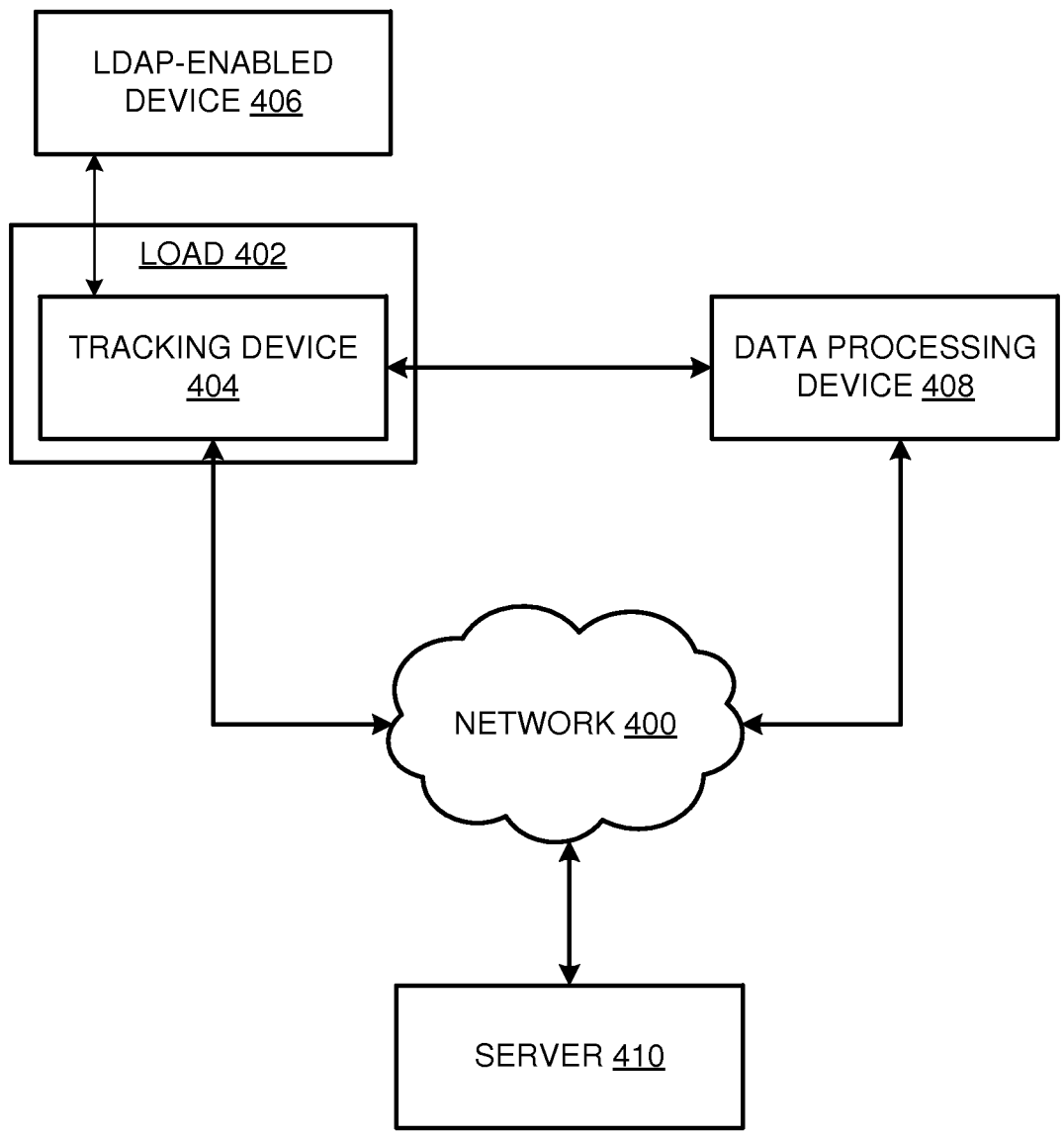
FIG. 4 is a block diagram illustrating communications performed between components within the tracking system of FIG. 1, according to one or more embodiments.

Reference is now made to FIG. 4, in which communication performed between components of the tracking system of FIG. 1 are illustrated. The tracking system may comprise a network 400. The network 400 may be a wide-area network (WAN), a local-area network (LAN), or a personal area network (PAN). The network 400 may be part of the Internet or may exist as an intranet. For example, a fleet of fishing vessels related through the same fishing company may be members of a single intranet.

The tracking system may track a load 402, which may comprise a TD 404. The TD 404 may be communicatively coupled to a lightweight directory access protocol (LDAP)-enabled device 406. The TD 404 may be further communicatively coupled to a data processing device (DPD) 408. The TD 404 and the DPD 408 may be communicatively coupled to a server 410 through the network 400.

LDAP is an application protocol that enables access and maintenance of directories through an internet protocol (IP) network. The LDAP-enabled device 406 may be used in concert with the TD 404 to facilitate authentication of the TD 404 in order to subsequently initiate the tracking of the load 402. The LDAP-enabled device 406 may comprise a memory, in which a MAC address whitelist may be stored. The LDAP-enabled device 406 may receive an LDAP query from the TD 404 during the course of authenticating a MAC address of the TD 404. Depending on whether the check is successful or unsuccessful, the LDAP-enabled device 406 may communicate an LDAP response to the TD 404. If the check was successful, the LDAP response may be a validation of the MAC address, which the TD 404 may require in order to initialize one or more environmental sensors of the TD 404. Once initialized, the TD 404 may commence tracking of the load 402, generating environmental data pertaining to an environment surrounding the load 402. The environmental data may be communicated to the DPD 408 and/or the server 410, through the network 400. The LDAP-enabled device 406 may be communicatively coupled to the DPD 408 or server 410 to update the MAC address whitelist.

Figure 5:
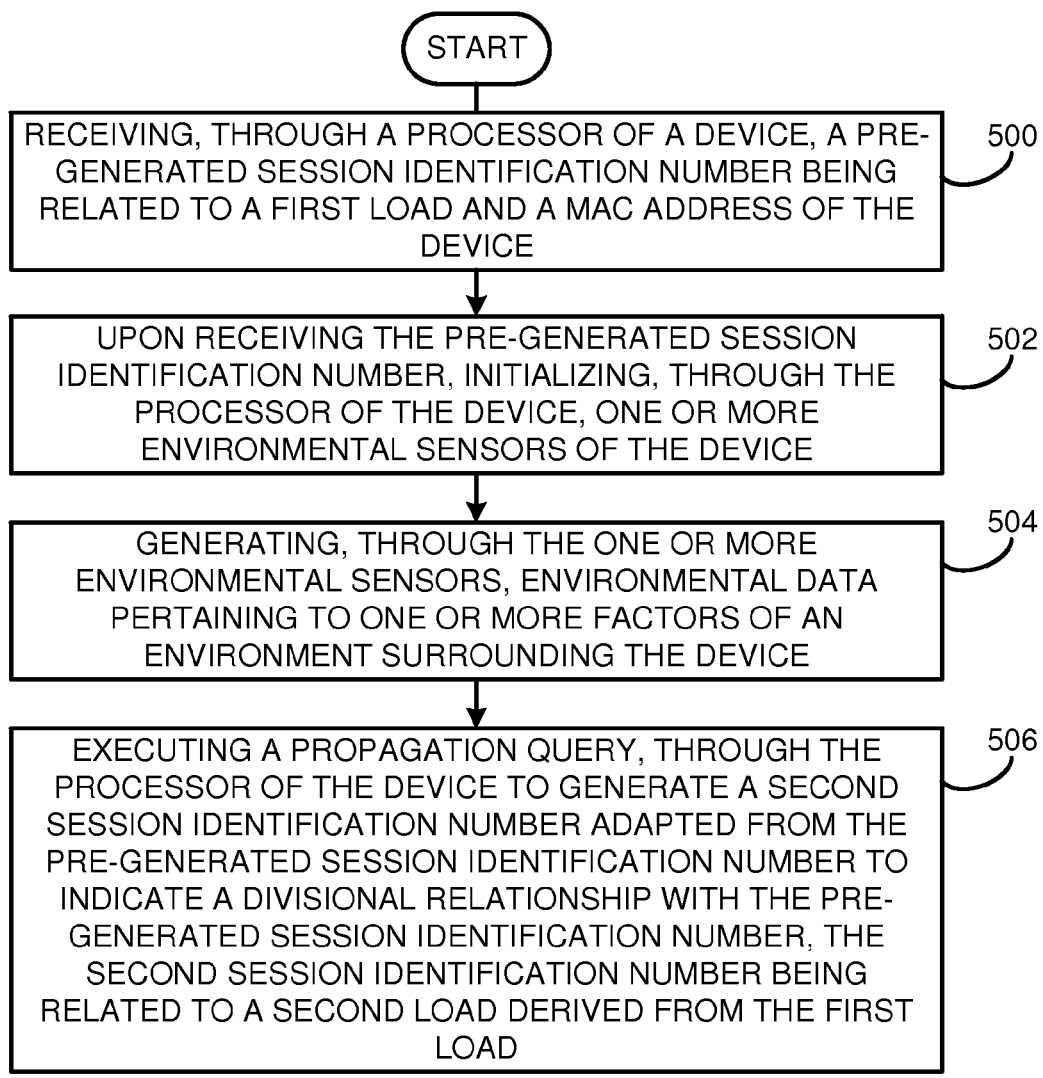
FIG. 5 is a flowchart illustrating a method of the tracking system of FIG. 1, according to one or more embodiments.

Reference is now made to FIG. 5, in which a method of the tracking system of FIG. 1 is illustrated, according to one or more embodiments. Operation 500 involves receiving, through a processor of a device, a pre-generated session identification number being related to a first load and a MAC address of the device. Operation 502 involves, subsequent upon receiving the pre-generated session identification number, initializing, through the processor of the device, one or more environmental sensors of the device. Operation 504 involves generating, through the one or more environmental sensors, environmental data pertaining to one or more factors of an environmental surrounding the device. Operation 506 involves executing a propagation query, through the processor of the device, to generate a second session identification number adapted from the pre-generated session identification number to indicate a divisional relationship with the pre-generated session identification number, the second session identification number being related to a second load derived from the first load.

Figure 6A:
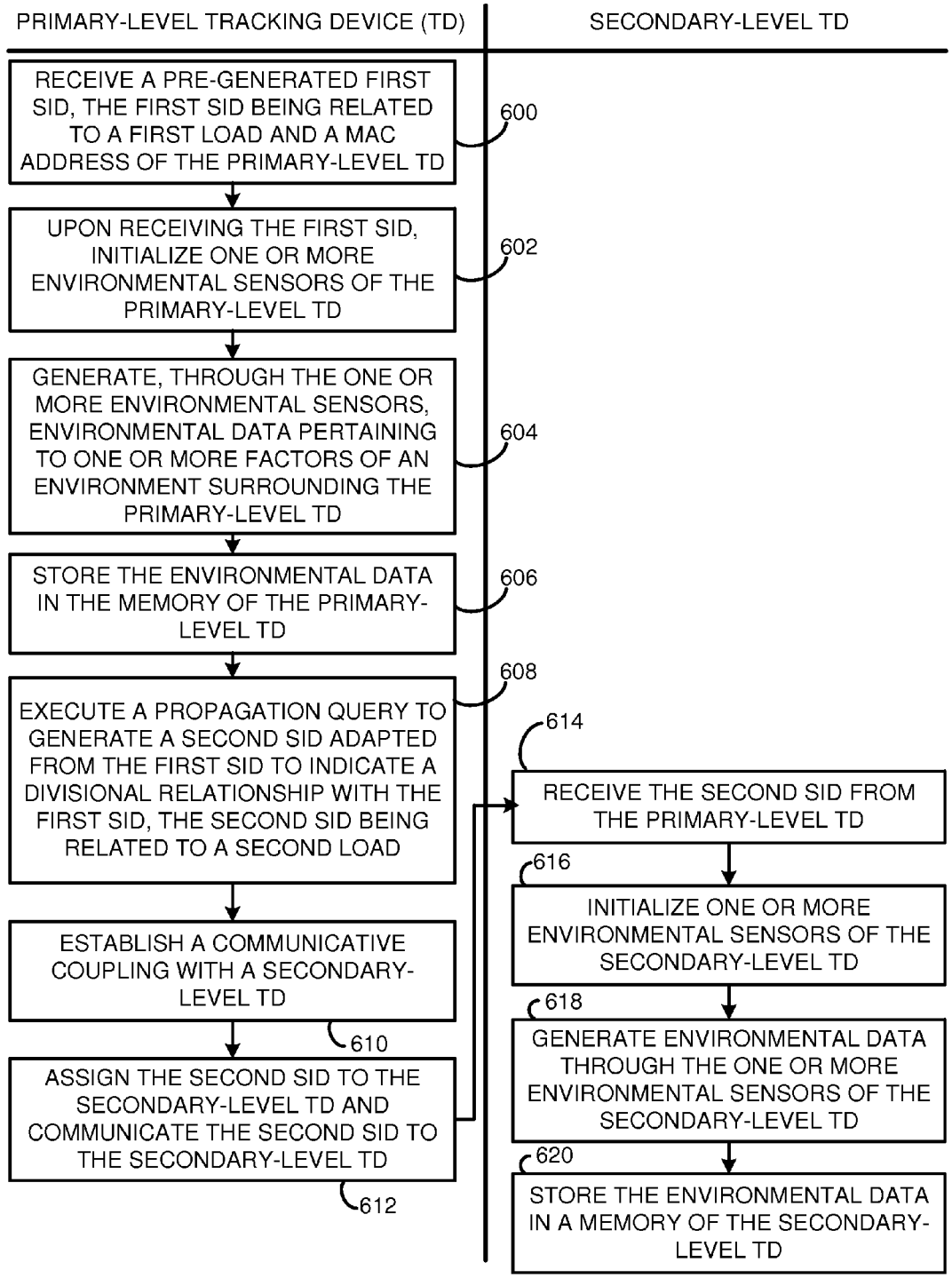
FIG. 6A is a segmented flowchart illustrating an embodiment of the tracking system of FIG. 1 comprising two or more tracking devices, according to one or more embodiments.
Figure 6C:
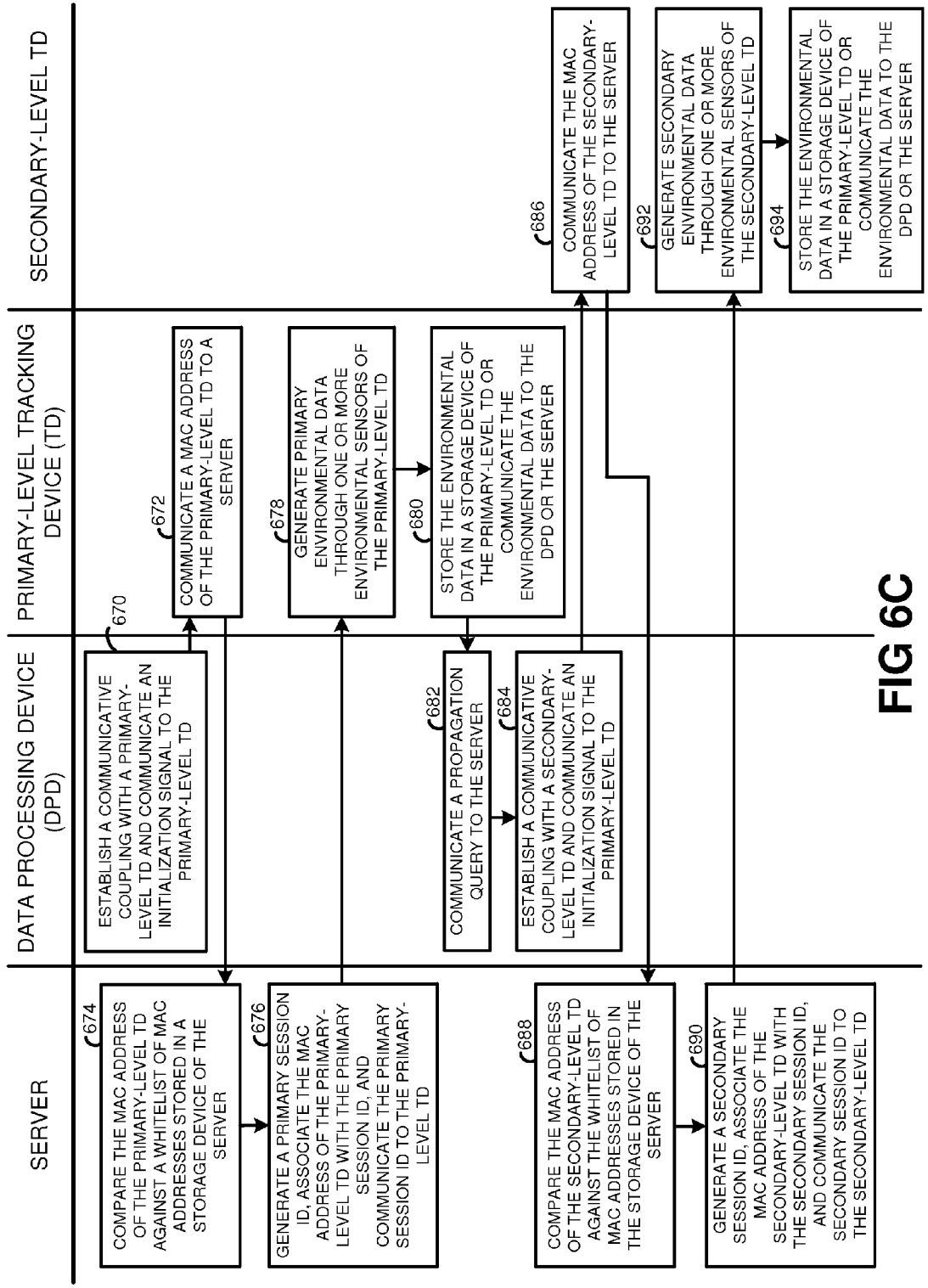
FIG. 6C is a segmented flowchart illustrating an embodiment of the tracking system of FIG. 1 comprising two or more tracking device, a data processing device, and a server, according to one or more embodiments.

Reference is now made to FIGS. 6A-6C, each of which illustrate a segmented flowchart demonstrating various embodiments of the tracking system of FIG. 1.

FIG. 6A illustrates a tracking system comprising a primary-level TD and a secondary-level TD. In Operation 600, the primary-level TD may receive a pre-generated first SID, the first SID being related to a first load and a MAC address of the primary-level TD. In Operation 602, the primary-level TD may, upon receiving the first SID, initialize one or more environmental sensors of the primary-level TD. In Operation 604, the primary-level TD may generate, through the one or more environmental sensors, environmental data pertaining to one or more factors of an environment surrounding the primary-level TD. In Operation 606, the primary-level TD may store the environmental data in the memory of the primary-level TD. In Operation 608, the primary-level TD may execute a propagation query to generate a second SID adapted from the first SID to indicate a divisional relationship with the first SID, the second SID being related to a second load. In Operation 610, the primary-level TD may establish a communicative coupling with a secondary-level TD. In Operation 612, the primary-level TD may assign the second SID to the secondary-level TD and communicate the second SID to the secondary-level TD. In Operation 614, the secondary-level TD may receive the second SID from the primary-level TD. In Operation 616, the secondary-level TD may initialize one or more environmental sensors of the secondary-level TD. In Operation 618, the secondary-level TD may generate environmental data through the one or more environmental sensors of the secondary-level TD. In Operation 620, the secondary-level TD may store the environmental data in a memory of the secondary-level TD.

In one embodiment, the traceability system may comprise two TDs, a first TD and a second TD. The first TD may comprise a first memory, and the second TD may comprise a second memory. A first TD may track a first load, while a second TD may track a second load. The first TD may initialize a first recording session and then propagate the first recording session to the second TD, in a manner detailed below.

The first TD may initialize a first recording session. To initialize the recording session, a processor of the first TD may execute instructions stored in the first memory. The instructions may cause the first TD to read a pre-generated first session ID number related to the first load and also related to a MAC address of the first TD, the pre-generated first session ID number being stored in the first memory. Upon initialization, the first TD may generate environmental data through one or more environmental sensors and store the data in the memory. These data may be associated with the first session ID. The environmental data may comprise temperature, salinity, light, pH, genomic information, mechanical strain and agitation. Other data may also be generated by the environmental sensors and are within the scope of the exemplary embodiments discussed herein.

The first TD may then propagate the recording session to the second TD. To propagate the recording session, the first TD may execute a propagation query to generate a second session ID adapted from the first session ID to indicate a divisional relationship with the first session ID. The second session ID may be related to the second load.

In one embodiment, the first TD may communicatively couple to a second TD. The first TD may then assign a second session ID to the second TD.

In another embodiment, upon being assigned a second session ID, the second TD may initialize one or more sensors. The second TD may then generate environmental data through the sensors, and store the environmental data in the memory of the second TD.

In yet another embodiment, the first TD may generate an encrypted report comprising the environmental data stored in the memory of the first TD (i.e. environmental data associated with the first load). The encrypted report may provide a user read-only access to the environmental data stored in the memory of the first TD. The first TD may then communicate the encrypted report to a first DPD communicatively coupled to the first device. The second TD may also generate an encrypted report comprising the environmental data stored in the memory of the second TD. The encrypted report may provide a user read-only access to the environmental data stored in the memory of the second TD (i.e. environmental data associated with the second load). The second TD may then communicate the encrypted report to a second DPD communicatively coupled to the second TD. An authorized user may then read the report on the first or the second DPD. In one embodiment, the user may enter a passcode on the first or the second DPD that would cause the first or the second DPD to decrypt and display the report.

In yet another embodiment, the first TD may store a hyperlink in a first RFID chip. An RFID chip or "tag" is a storage device that communicates through use of electromagnetic fields to transfer data, and does not require precise orientation between a reader and a "tag" when the "tag" is being read by the reader. Since data can be easily stored and read from a "tag" that is enabled in this way, these tags are often used to track and identify objects in transit. In one embodiment, the hyperlink stored on the RFID "tag" may provide a user access to the encrypted report comprising environmental data stored in the memory of the first TD. The second TD may also store a hyperlink in a second RFID "tag" of the second TD. The hyperlink may provide a user access to the encrypted report comprising environmental data stored in the memory of the second TD.

In another embodiment, the first RFID chip may be external to the first TD and may accompany specific units within a load. For example, in a load of seafood, the first TD may be placed within the load, but the first RFID (or a plurality thereof) may accompany a subunit of the load (e.g. a single crate of fish, specific fish, etc.).

One embodiment of the system may be applied to track a load which is divided en route. For example, Producer A may ship a load of fish to Company B for processing, and Company B may ship subshipments of the load to Companies C and D. Producer A may place a first TD with the load of fish for shipping from Producer A to Company B. The first TD may initialize a recording session, collect environmental data, and associate the data with a first session ID assigned to the recording session. Company B may process the fish and divide the load into a subshipment C bound for Company C, and a subshipment D bound for Company D. Company B may then send the first TD back to Producer A so that Producer A can review the data tracked by and stored in the first TD. Company B may also propagate the first session ID of the first recording session from the first TD to a second and a third TD, and place the second TD with subshipment C and the third TD with subshipment D. The session ID of the second and third TDs may be associated with the first session ID of the first TD, such that the relationship between the two subshipments and the original shipment may be understood by authorized users. Both the second TD and the third TD may collect environmental data associated with their respective session IDs. Once the subshipments arrive at Companies C and D, the environmental data stored in the memories of the TDs may be accessed by users at Companies C and D, such that the users can make informed decisions regarding the safety and quality of the fish. A user at Company C may use a DPD to access an encrypted report generated by the second TD and stored in the memory of the second TD. The user may enter a passcode on the DPD to gain access to the encrypted report. Additionally, were a foodborne disease be discovered by consumers of Company D, subshipment C may be quickly identified as possibly contaminated due to the relationship between the second and third session IDs, and the source of the disease may be traced back to Company B or Producer A due to the relationship between the first, second and third session IDs. In another embodiment, the first TD may not be sent back to Producer A, but rather placed with one of the subshipments after the propagation event. In yet another embodiment, during processing of subshipment D at Company D, the third TD may store a hyperlink in an RFID "tag" to provide a user access to the encrypted report. The RFID "tag" may then be placed within a subshipment E of subshipment D, and then the subshipment E may then be shipped to Retailer E. An authorized user at Retailer E may use a handheld RFID reader (e.g. a smartphone) to access the encrypted report and subsequently examine relevant information, such as location of origin, environmental data, and other data.

A traceability system utilizing only TDs may be beneficial for a number of reasons. Such a traceability system does not require a centralized server and instead utilizes robust, stand-alone TDs that create a self-sustaining tracking solution. Furthermore, data security is enhance since the data is localized to the TD by which it was generated and may only be retrieved or wiped by authorized devices (i.e. with MAC addresses on the MAC address whitelist). Such a traceability system may be ideal for a small to medium-scale operation with limited funds.

In another embodiment, the traceability system may involve one or more TDs and one or more servers. A first TD may comprise a first memory. A server may comprise a processor and a second memory, in which second memory may be stored a whitelist of MAC addresses. The first TD may be communicatively coupled to the server. The first TD may track a first load. The first TD may receive a first session ID from the server, initialize a first recording session associated with the first session ID, and then query the server for a second session ID which may be later assigned to a second TD, in the manner detailed below.

The first TD may initialize a first recording session. To initialize the first recording session, the processor of the first TD may execute instructions stored in the first memory of the first TD. The instructions may cause the first TD to communicate its MAC address to the server. The server may then generate, through the processor of the server, the first session ID upon a successful match when comparing the MAC address of the first device against one or more MAC addresses of the whitelist. The first TD may then receive the first session ID from the server.

Upon receiving the first session ID, the first TD may associate the first session ID to the first load and may also associate the first session ID to the MAC address of the first TD. This association may be stored in the memory of the first TD and/or may be communicated to the server to be stored in the memory of the server. The first TD may then initialize a first recording session. Upon initialization, the first TD may generate environmental data through one or more environmental sensors and store the data in the first memory. These data may be associated with the first session ID. The environmental data may comprise temperature, salinity, light, pH, genomic information, mechanical strain and agitation. Other data may be generated by the environmental sensors.

The first TD may then propagate the recording session. To propagate the recording session, the first TD may communicate a propagation query to the server. Upon receiving and executing the propagation query, the server may generate a second session ID adapted from the first session ID to indicate a divisional relationship with the first session ID. The second session ID may later be assigned to a second recording session of a second TD tracking a second load. Record of the assignation may be tracked by the server and stored in the second memory of the server.

In one embodiment, the system may further comprise an LDAP device. In one embodiment, the LDAP device may be a USB dongle. In other embodiment, the LDAP device may be a data processing device. In yet another embodiment, the LDAP device may be a server.

To increase security, assigning the first session ID to the first device may comprise further steps involving the LDAP device. The first TD may communicate an LDAP request to the LDAP device. The LDAP request may be an LDAP MAC address query request. The LDAP device may generate an LDAP response validating the LDAP MAC address query request and communicate the LDAP response to the first TD. The first TD may then proceed to assign the first session ID to the first load and to the MAC address of the first TD.

In one embodiment, the traceability system may further comprise a second TD, the second TD being communicatively coupled to the server. The second TD may comprise a third memory. The third memory may comprise instructions that, when executed by the second TD, cause it to communicate with the server and initialize a second recording session. The second TD may track the second load.

The second TD may initialize a second recording session. To initialize the second recording session, a processor of the second TD may execute instructions stored in the third memory of the second TD. The instructions may cause the second TD to receive the second session ID from the server (i.e. the session ID having been propagated from the first session ID), the second session ID being assigned to the MAC address of the second TD. The second session ID may be adapted from the first session ID to demonstrate a divisional relationship with the first session ID. Upon assigning the second session ID, the second TD may then initialize the second recording session. Upon initialization, the second TD may generate environmental data through one or more environmental sensors and store the data in the third memory. These data may be associated with the second session ID. The environmental data may comprise temperature, salinity, light, pH, genomic information, mechanical strain and agitation. Other data may be generated by the environmental sensors. The second TD may communicate the data to the server to be stored in the second memory.

In yet another embodiment, the first TD may further execute processes that involve communicating environmental data to the server. Specifically, the first memory of the first TD may comprise a further instructions that, when executed by the processor of the first TD, may cause the first TD to communicate the environmental data generated by the one or more environmental sensors of the first TD to the server.

In one embodiment, the data may be aggregated. The memory of the server may further comprise instructions that, when executed by the processor of the server, cause the server to aggregate the data through the processor of the server. The data may comprise the data generated through the one or more environmental sensors of the first TD and the one or more environmental sensors of the second TD. In one embodiment, the aggregated data may be stored in a database. The server may then further generate, through the processor of the server, one or more views of the aggregated environmental data. The one or more views may provide varying degrees of detail pertaining to at least one of the first load and the second load. In one embodiment, the views may comprise joined relation tables. In another embodiment, the views may comprise text, for example, summaries of the data generated by the first TD and the second TD. In yet another embodiment, the views may comprise graphical analytics, such as line graphs or bar graphs.

In one embodiment, the system may further comprise a DPD. The DPD may be a server, a computer, a tablet, a smartphone, or another type of DPD.

For convenient and secure user reference, the DPD may receive an encrypted report from the first or the second TD. The memory of the first TD and the memory of the second TD may further comprise instructions that when executed by the first or the second TD cause the first or the second TD to generate an encrypted report. The encrypted report may comprise the environmental data generated by the first or the second TD. The encrypted report may provide a user read-only access to the environmental data generated by the first TD or the second TD. The first or the second TD may then communicate the encrypted report to a data processing device communicatively coupled to the first or the second TD. The encrypted report may only be accessed by users who have access privileges; different users may have different levels of access privilege. Aspects of privileged access which may be restricted include access to specific data sets and read/write capabilities. For example, within a commercial fishing operation, the fishing operations manager may have full access to data including read/write capabilities to enter authorized edits, while a fishing vessel captain may have read-only access to data from all the vessels he captains, and a fishing vessel owner may have read-only access to data from his vessel. A dock worker or fishing vessel crew member may only have limited, read-only access to data—for example, data regarding the number of subshipments into which the load will be divided. Oversight agencies may have read-only access to all data for convenient, secure audits. In addition, encrypted reports may be used to calculate and target micropayments to reporting entities. For example, an organization may elect to pay commercial fishing companies or shipping companies small fees in return for the companies' collecting, aggregating and reporting of environmental data of the loads to the organization. The encrypted report may comprise identifying information, such as usernames or MAC addresses of devices, that may allow secure and accurate disbursement of micropayments to individuals associated with the usernames or companies/individuals who own the devices.

The MAC address of the DPD may be associated with environmental data generated by TDs that it initialized. As such, shipments may be traced not only to their geospatial origins but also to the DPDs that authorized the tracking of the shipments. Tracking a DPD's associations may facilitate accountability as well as enable a micropayment system that incentivizes fishing operations and processing plants to track shipments originating at or passing through their respective facilities. Furthermore, the DPD may require user credentials to be entered in order to authorize initialization of a TD. The user credentials may be associated with environmental data generated by the TD. As such, shipments may also be traced to specific dock workers, processing plant workers, or any user that may initialize an original TD or propagate the session ID of an original TD to another TD. Tracking user credentials in this way may facilitate accountability as well as enable a micropayment system that incentivizes users of the traceability system to maximize utility of the traceability system.

In one embodiment, the first TD may further comprise a first radio-frequency identification (RFID) chip, and the second TD may further comprise a second RFID chip.

For secure traceability further down the supply chain, the TD may provide users access to the encrypted data report through a hyperlink stored in an RFID chip. The memory of the first TD and the memory of the second TD may further comprise instructions that, when executed by the first TD or the second TD, cause the first TD or the second TD to store a hyperlink in an RFID chip. The hyperlink may provide a user access to the encrypted report of environmental data collected by the TD. The TD may store hyperlinks in multiple RFID chips, and the RFID chips may be included with multiple subshipments of a single shipment. During transport or upon delivery, an authorized user may scan an RFID chip and follow the hyperlink to access the encrypted report. To increase security, a passcode may be required to follow the hyperlink or access the report. For example, after a chain of TDs has been utilized to trace a load of fish from the dock to a processing plant, a user at the processing plant may trigger the TD to generate an encrypted report of data including temperature, GPS location, timestamps, and agitation. The user may then trigger the TD to store a hyperlink in an RFID chip, providing access to this report. The processing plant may then break the load into subshipments, include an RFID chip with each subshipment, and send individual subshipments to individual wholesalers. As the transport between processing plant and wholesaler may already be secure and brief, a TD recording temperature, agitation, GPS location and timestamps may be unnecessary or cost-prohibitive for that period. However, an RFID chip may provide a user at the wholesaler with access to information establishing the safety, quality and security of the load during the less transparent transport from dock to processing plant.

FIG. 6B illustrates a tracking system comprising a DPD, a primary-level TD, and a secondary-level TD. In Operation 630, the DPD may establish a communicative coupling with and communicate an initialization signal to a primary-level TD. In Operation 632, the primary-level TD may communicate a MAC address of the primary-level TD to the DPD. In Operation 634, the DPD may compare the MAC address of the primary-level TD against a whitelist of MAC addresses stored in a storage device of the DPD. In Operation 636, the DPD may generate a primary session ID and associate the MAC address of the primary-level TD with the primary session ID. In Operation 638, the DPD may communicate the primary session ID to the primary-level TD. In Operation 640, the primary-level TD may initialize one or more environmental sensors of the primary-level TD. In Operation 642, generate primary environmental data through one or more environmental sensors of the primary-level TD. In Operation 644, the primary-level TD may store the environmental data in a storage device of the primary-level TD or communicate the environmental data to the DPD. In Operation 646, primary-level TD may communicate a propagation query to the DPD. In Operation 648, the DPD may establish a communicative coupling with and communicate an initialization signal to a secondary-level TD. In Operation 650, the secondary-level TD may communicate a MAC address of the secondary-level TD to the DPD. In Operation 652, the DPD may compare the MAC address of the secondary-level TD against a whitelist of MAC addresses stored in a storage device of the DPD. In Operation 654, the DPD may generate a secondary session ID, associate the MAC address of the secondary-level TD with the secondary session ID, and communicate the secondary session ID to the secondary-level TD. In Operation 656, the secondary-level TD may generate secondary environmental data through one or more environmental sensors of the secondary-level TD. In Operation 658, the secondary-level TD may store the environmental data in a storage device of the primary-level TD or communicate the environmental data to the DPD.

In another embodiment, the tracking system may involve one or more TDs and one or more DPDs.

A first TD may comprise a first memory, and a second TD may comprise a second memory. A first TD may track a first load, while the second TD may track a second load. A first DPD may comprise a memory. A whitelist of MAC addresses of associated TDs permitted to be initialized by the DPD may be stored in the memory of the DPD. The first DPD may further comprise a processor and a display. The first DPD may communicatively couple with the first TD and the second TD. The DPD may initialize a recording session of the first TD and assign a session ID to the recording session.

The first TD may communicatively couple to the DPD. The memory of the first TD may comprise instructions that, when executed by the processor of the first TD, may cause the first TD to communicate with the DPD and initialize a recording session.

The DPD may communicate, and the first TD may receive, an initialization signal. Upon receiving the initialization signal, the first TD may communicate its MAC address to the DPD. The DPD may then compare, through the processor of the DPD, the MAC address of the first TD against one or more MAC addresses aggregated in the whitelist stored in the memory of the DPD. The DPD may then generate a session ID and communicate the session ID to the first TD.

The DPD may assign the session ID to the TD, to the first load, and to the MAC address of the first TD.

The first TD may initialize one or more environmental sensors of the first TD, generate environmental data through the one or more environmental sensors, and store the data in the memory of the first TD. These data may be associated with the first session ID. The environmental data may comprise temperature, salinity, light, pH, genomic information, mechanical strain and agitation. Other data may be generated by the environmental sensors.

The first TD may then propagate the recording session to the second TD. To propagate the recording session, the first TD may communicate a propagation query to the DPD. Upon receiving the propagation query, the DPD may generate a second session ID adapted from the first session ID to indicate a divisional relationship with the first session ID.

In one embodiment, the initialization signal is achieved through a communicative coupling event between the TD and the DPD. The communicative coupling may be achieved through wired connection, NFC, Bluetooth, WiFi, a data connection, or other forms of communicative coupling.

In one embodiment, the system may further comprise the second TD communicatively coupled to the DPD. The memory of the second TD may comprise instructions that, when executed by the processor of the second TD, may cause the second TD to communicate with the DPD and initialize a recording session.

The DPD may communicate, and the second TD may receive, an initialization signal. Upon receiving the initialization signal, the second TD may communicate its MAC address to the DPD. The DPD may then compare, through the processor of the DPD, the MAC address of the second TD against one or more MAC addresses aggregated in the whitelist stored in the memory of the DPD. The DPD may then generate a session ID and communicate the session ID to the second TD. Upon receiving the session ID, the second TD may generate environmental data through one or more environmental sensors of the second TD, and store the data in the memory of the second TD. These data may be associated with the second session ID. The environmental data may comprise temperature, salinity, light, pH, genomic information, mechanical strain and agitation. Other data may be generated by the environmental sensors.

In one embodiment, the data may be aggregated by the DPD. The memory of the DPD may further comprise instructions that, when executed by the processor of the DPD, cause the DPD to aggregate the data through the processor of the DPD. The data may comprise the data generated through the one or more environmental sensors of the first TD and the one or more environmental sensors of the second TD. In one embodiment, the aggregated data may be stored in a database. The server may then further generate, through the processor of the DPD, one or more views of the aggregated environmental data. The one or more views may provide varying degrees of detail pertaining to at least one of the first load and the second load. In one embodiment, the views may comprise joined relation tables. In another embodiment, the views may comprise text, for example summaries. In yet another embodiment, the views may comprise graphical representations, for example line graphs or bar graphs.

For convenient and secure user reference, the DPD may receive an encrypted report from the TD. In one embodiment, the memory of the first TD and the memory of the second TD may further comprise instructions that when executed by the first TD or the second TD cause the first TD or the second TD to generate an encrypted report. The encrypted report may comprise the environmental data generated by the first TD or the second TD. The encrypted report may provide a user read-only access to the environmental data generated by the first TD or the second TD. The first TD or the second TD may then communicate the encrypted report to the DPD communicatively coupled to the first TD or the second TD. The encrypted report may only be accessed by users who have privileged access; different users may have different levels of privilege. Aspects of privileged access which may be restricted include access to specific data sets and read/write capabilities.

As described above, the ad hoc network of devices created by the communicatively coupled TD and DPD may take over the functionality of a cloud-based server in similar networks. For example, a TD tracking load transported in a less-developed area may be securely initialized by a DPD operated by authorities at the dock, and the recording session may be later propagated by authorized DPDs operated by workers at a processing plant. The encrypted reports of the recording sessions may be aggregated and securely stored by authorized DPDs at final destinations of the load, and the reports may be separately uploaded and emailed by workers at the final destinations.

For secure traceability further down the supply chain, the TD may provide users access to the encrypted data report through a hyperlink stored in an RFID chip. In one embodiment, the memory of the first TD and the memory of the second TD may further comprise instructions that, when executed by the first TD or the second TD, cause the first TD or the second TD to store a hyperlink in an RFID chip. The hyperlink may provide a user access to the encrypted report of environmental data collected by the TD. The TD may store hyperlinks in multiple RFID chips, and the RFID chips may be included with multiple subshipments of a single shipment.

FIG. 6C illustrates a tracking system comprising a server, a DPD, a primary-level TD, and a secondary-level TD. In Operation 670, the DPD may establish a communicative coupling with a primary-level TD and communicate an initialization signal to the primary-level TD. In Operation 672, the primary-level TD may communicate a MAC address of the primary-level TD to a server. In Operation 674, the server may compare the MAC address of the primary-level TD against a whitelist of MAC addresses stored in a storage device of the server. In Operation 676, the server may generate a primary session ID, associate the MAC address of the primary-level TD with the primary session ID, and communicate the primary session ID to the primary-level TD. In Operation 678, the primary-level TD may generate primary environmental data through one or more environmental sensors of the primary-level TD. In operation 680, the primary-level TD may store the environmental data in a storage device of the primary-level TD or communicate the environmental data to the DPD or the server. In Operation 682, the DPD may communicate a propagation query to the server. In Operation 684, the DPD may establish a communicative coupling with a secondary-level TD and communicate an initialization signal to the primary-level TD. In Operation 686, the secondary-level TD may communicate the MAC address of the secondary-level TD to the server. In Operation 688, the server may compare the MAC address of the secondary-level TD against the whitelist of MAC addresses stored in the storage device of the server. In Operation 690, the server may generate a secondary session ID, associate the MAC address of the secondary-level TD with the secondary session ID, and communicate the secondary session ID to the secondary-level TD. In Operation 692, the secondary-level TD may generate secondary environmental data through one or more environmental sensors of the secondary-level TD. In Operation 694, the secondary-level TD may store the environmental data in a storage device of the primary-level TD or communicate the environmental data to the DPD or the server.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system. Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A device for tracking a first load comprising:
a processor;
a memory communicatively coupled to the processor, the memory comprising instructions that when executed by the processor of the device cause the device to perform operations comprising:
receiving a pre-generated session identification number, wherein the pre-generated session identification number is assigned to the first load and a MAC address of the device;
initializing one or more environmental sensors of the device;
generating, through the one or more environmental sensors, environmental data pertaining to one or more factors of an environment surrounding the device; and
executing a propagation query to generate a second session identification number adapted from the pre-generated session identification number to indicate a divisional relationship with the pre-generated session identification number, the second session identification number being related to a second load derived from the first load.

2. The device of claim 1, wherein receiving the pre-generated session identification number further comprises:
communicating a Lightweight Directory Access Protocol (LDAP) request comprising a MAC address query to an LDAP-enabled device,
wherein the LDAP-enabled device subsequently compares a MAC address of the MAC address query against a directory of MAC addresses stored in a memory of the LDAP-enabled device, and
wherein the LDAP-enabled device generates an LDAP response to the LDAP request and communicates the LDAP response to the processor of the device.

3. The device of claim 1, wherein the memory of the device comprises further instructions that when executed by the processor of the device cause the device to perform operations comprising:
establishing a secure connection with a server, wherein establishing the secure connection comprises comparing the MAC address of the device against one or more MAC addresses aggregated in a whitelist stored in a memory of the server; and
communicating the environmental data to the server.

4. The device of claim 3, wherein the memory comprises further instructions that when executed by the processor of the device cause the device to perform operations comprising:
upon executing the propagation query:
communicatively coupling with a second device, and
assigning the second session identification number to the second device.

5. The device of claim 4, further comprising:
wherein assigning the second session identification number to the second device initializes one or more environmental sensors of the second device, and
wherein upon initializing the one or more environmental sensors of the second device, the one or more environmental sensors of the second device generate environmental data pertaining to one or more factors of an environment surrounding the second device.

6. The device of claim 5, further comprising:
wherein the environmental data pertaining to the one or more factors of the environment surrounding the device and the environmental data pertaining to the one or more factors of the environment surrounding the second device are aggregated through a database management system executed by the server, and
wherein the server generates one or more views of the aggregated environmental data, the one or more views providing varying degrees of detail pertaining to at least one load of the first load and the second load.

7. The device of claim 6, wherein the memory of the device further comprises instructions that when executed by the processor, cause the device to perform operations comprising:
storing a hyperlink in a radio-frequency identification chip, the hyperlink providing a user access to a generated view of the aggregated environmental data.

8. The device of claim 1, wherein the memory of the device further comprises instructions that when executed by the processor cause the device to perform operations comprising:
generating an encrypted report comprising the environmental data, the encrypted report
providing a user access to the environmental data based on a privilege level of the user; and
communicating the encrypted report to a data processing device communicatively coupled to the device.

9. A method of tracking a first load, comprising:
receiving, through a processor of a device, a pre-generated session identification number, the pre-generated session identification number being related to the first load and a MAC address of the device;
upon receiving the pre-generated session identification number, initializing, through the processor of the device, one or more environmental sensors of the device;
generating, through the one or more environmental sensors, environmental data pertaining to one or more factors of an environment surrounding the device; and
executing a propagation query, through the processor of the device, to generate a second session identification number adapted from the pre-generated session identification number to indicate a divisional relationship with the pre-generated session identification number, the second session identification number being related to a second load derived from the first load.

10. The method of claim 9, further comprising:
establishing, through the processor, a secure connection with a server,
wherein establishing the secure connection comprises comparing the MAC address of the device against one or more MAC addresses aggregated in a whitelist stored in a memory of the server; and
communicating the environmental data to the server.

11. The method of claim 10, further comprising:
upon executing the propagation query:
communicatively coupling with a second device; and
communicating the second session identification number to the second device.

12. The method of claim 11, further comprising:
wherein communicating the second session identification number to the second device initializes one or more environmental sensors of the second device, and
wherein upon initializing the one or more environmental sensors of the second device, the one or more environmental sensors of the second device generate environmental data pertaining to one or more factors of an environment surrounding the second device.

13. The method of claim 12, further comprising:
wherein the environmental data pertaining to the one or more factors of the environment surrounding the device and the environmental data pertaining to the one or more factors of the environment surrounding the second device are aggregated through a database management system executed by the server, and
wherein the server generates one or more views of the aggregated environmental data, the one or more views providing varying degrees of detail pertaining to at least one load of the first load and the second load.

14. The method of claim 13, further comprising:
storing a hyperlink in a radio-frequency identification chip of the device, the hyperlink providing a user access to the one or more views of the aggregated environmental data.

15. The method of claim 9, further comprising:
generating an encrypted report comprising the environmental data, the encrypted report providing a user access to the environmental data based on a privilege level of the user; and
communicating the encrypted report to a data processing device communicatively coupled to the device.

16. A system comprising:
a first device tracking a first load, the first device comprising a processor and a memory communicatively coupled to the processor;
a second device tracking a second load derived from the first load wherein the second device comprises a processor and a memory communicatively coupled to the processor;
wherein the memory of the first device stores instructions that when executed by a
processor of the first device cause the first device to perform operations comprising:
receiving a pre-generated first session identification number, the pre-generated first session identification number being related to the first load and a MAC address of the first device;
upon receiving the pre-generated first session identification number, initializing one or more environmental sensors of the first device;
generating, through the one or more environmental sensors, environmental data pertaining to one or more factors of an environment surrounding the first device;
storing the environmental data in the memory of the first device; and
executing a propagation query to generate a second session identification number adapted from the pre-generated first session identification number to indicate a divisional relationship with the pre-generated first session identification
number, the second session identification number being related to the second load.

17. The system of claim 16, further comprising:
wherein the memory of the first device further comprises instructions that when executed by the processor of the first device cause the first device to perform operations comprising:
upon executing the propagation query,
communicatively coupling to the second device; and
assigning the second session identification number to the second device.

18. The system of claim 17, further comprising:
wherein assigning the second session identification number to the second device initializes one or more environmental sensors of the second device,
wherein upon initializing the one or more environmental sensors of the second device, the second device:
generates, through the one or more environmental sensors of the second device, environmental data pertaining to one or more factors of an environment surrounding the second device, and
stores the environmental data generated through the one or more environmental sensors of the second device in the memory of the second device.

19. The system of claim 18, further comprising:
wherein the memory of the first device comprises instructions that when executed by the processor of the first device cause the first device to perform operations comprising:
generating an encrypted report comprising the environmental data stored in the memory of the first device, the encrypted report providing a user read-only access to the environmental data stored in the memory of the first device;
communicating the encrypted report to a data processing device communicatively coupled to the first device;
wherein the memory of the second device comprises instructions that when executed by the processor of the second device cause the second device to perform operations comprising:
generating an encrypted report comprising the environmental data stored in the memory of the second device, the encrypted report providing a user read-only access to the environmental data stored in the memory of the second device; and
communicating the encrypted report to a data processing device communicatively coupled to the second device.

20. The system of claim 19, further comprising:
wherein the memory of the first device comprises instructions that when executed by the processor of the first device cause the first device to perform operations comprising:
storing a hyperlink in a radio-frequency identification chip, the hyperlink providing a user access to the encrypted report comprising the environmental data stored in the memory of the first device; and
wherein the memory of the second device comprises instructions that when executed by the processor of the second device cause the second device to perform operations comprising:
storing a hyperlink in another radio-frequency identification chip, the hyperlink providing a user access to the encrypted report comprising the environmental data stored in the memory of the second device.

21. A system, comprising:
a server comprising a memory storing a whitelist comprising one or more MAC addresses;
a first device communicatively coupled to the server, the first device tracking a first load and comprising a processor and a memory, the memory communicatively coupled to the processor, the memory comprising instructions that when executed by the processor of the first device cause the first device to perform operations comprising:
communicating a MAC address of the first device to the server;
receiving a first session identification number from the server, wherein the first session identification number is generated by the server upon comparing, through a processor of the server, the MAC address of the first device against one or more MAC addresses of the whitelist and wherein the first session identification number is assigned to the first load and the MAC address of the first device;
initializing one or more environmental sensors of the first device;
generating, through the one or more environmental sensors of the first device, environmental data pertaining to one or more factors of an environment surrounding the first device; and
communicating a propagation query to the server that when executed by the server causes the server to generate a second session identification number adapted from the first session identification number to indicate a divisional relationship with the first session identification number, the second session identification number being assigned to a second load derived from the first load;
upon receiving the MAC address query, comparing a MAC address of the MAC address query against a directory of MAC addresses stored in a memory of the LDAP-enabled device; and
upon comparing the MAC address against the directory of MAC addresses, generating an LDAP response to the LDAP request and communicating the LDAP response to at least one of the processor of the server or the processor of the first device.

22. The system of claim 21, further comprising:
an LDAP-enabled device configured to:
receive, through at least one of the processor of the server or the processor of the first device, an LDAP request comprising a MAC address query;
upon receiving the MAC address query, comparing a MAC address of the MAC address query against a directory of MAC addresses stored in a memory of the LDAP-enabled device; and
upon comparing the MAC address against the directory of MAC addresses, generating an LDAP response to the LDAP request and communicating the LDAP response to at least one of the processor of the server or the processor of the first device.

23. The system of claim 21, further comprising:
a second device communicatively coupled to the server, the second device tracking the second load and comprising a processor and a memory communicatively coupled to the processor, the memory of the second device comprising instructions that when executed by the processor of the second device cause the second device to perform operations comprising:
receiving the second session identification number from the server, the second session identification number being assigned to a MAC address of the second device;
initializing one or more environmental sensors of the second device;
generating, through the one or more environmental sensors of the second device, environmental data pertaining to one or more factors of an environment surrounding the second device;
communicating the environmental data to the server; and
wherein the memory of the first device comprises a further instruction that when executed by the processor of the first device causes the first device to communicate the environmental data generated by the one or more environmental sensors of the first device to the server.

24. The systems of claim 23, further comprising:
wherein the memory of the server comprises instructions that when executed by a processor of the server cause the server to perform operations comprising:
aggregating, through the processor of the server, the environmental data generated through the one or more environmental sensors of the first device and the one or more environmental sensors of the second device,
generating, through the processor of the server, one or more views of the aggregated environmental data, the one or more views providing varying degrees of detail pertaining to at least one load of the first load and the second load.

25. The system of claim 24, further comprising:
wherein the memory of the first device comprises further instructions that when executed by the processor of the first device cause the first device to perform operations comprising:
generating an encrypted report comprising the environmental data generated by the first device, the encrypted report providing a user read-only access to the environmental data generated by the first device; communicating the encrypted report to a data processing device communicatively coupled to the first device;
wherein the memory of the second device comprises further instructions that when executed by the second device cause the second device to perform operations comprising:
generating an encrypted report comprising the environmental data generated by the second device, the encrypted report providing a user read-only access to the environmental data generated by the second device; and communicating the encrypted report to a data processing device communicatively coupled to the second device.

26. The system of claim 25, further comprising:
wherein the memory of the first device comprises further instructions that when executed by the processor of the first device cause the first device to perform operations comprising:
storing a hyperlink in a radio-frequency identification chip of the first device, the hyperlink providing a user access to the encrypted report generated by the first device; and
wherein the memory of the second device comprises further instructions that when executed by the processor of the second device cause the second device to perform operations comprising:
storing a hyperlink in a radio-frequency identification chip of the second device, the hyperlink providing a user access to the encrypted report generated by the second device.

27. A system comprising:
a data processing device comprising a processor and a memory communicatively coupled to the processor;
a tracking device communicatively coupled to the data processing device, the tracking device tracking a first load and comprising a processor and a memory communicatively coupled to the processor, the memory comprising instructions that when executed by the processor of the tracking device cause the tracking device to perform further operations comprising:
receiving an initialization signal from the data processing device;
communicating a MAC address of the tracking device to the data processing device;
receiving a session identification number from the data processing device,
wherein the session identification number is generated by the data processing device and communicated to the tracking device upon comparing, through a processor of the data processing device, the MAC address of the tracking device against one or more MAC addresses aggregated in a whitelist stored in the memory of the data processing device,
wherein the session identification number is related to the first load and the MAC address of the tracking device; initializing one or more environmental sensors of the tracking device; generating, through the one or more environmental sensors, environmental data pertaining to one or more factors of an environment surrounding the tracking device; and
communicating a propagation query to the data processing device that when executed by the data processing device causes the data processing device to generate a second session identification number adapted from the session identification number to indicate a divisional relationship with the session identification number, the second session identification number being related to a second load derived from the first load.

28. The system of claim 27, wherein receiving the initialization signal is achieved through a communicative coupling event between the tracking device and the data processing device.

29. The system of claim 27, further comprising:
a second tracking device communicatively coupled to the data processing device, the second tracking device tracking the second load and comprising a processor and a memory communicatively coupled to the processor, the memory of the second tracking device comprising instructions that when executed by the processor of the second tracking device cause the second tracking device to perform operations comprising:
receiving the second session identification number from the data processing device, the second session identification number being assigned to a MAC address of the second tracking device;
initializing one or more environmental sensors of the second tracking device;
generating, through the one or more environmental sensors of the second tracking device, environmental data pertaining to one or more factors of an environment surrounding the second tracking device;
communicating the environmental data to the data processing device;
and wherein the memory of the tracking device comprises a further instruction that when executed by the processor of the tracking device causes the tracking device to communicate the environmental data generated by the one or more environmental sensors of the tracking device to the data processing device.

30. The system of claim 29, further comprising:
wherein the memory of the data processing device comprises instructions that when executed by the processor of the data processing device cause the data processing device to perform operations comprising:
aggregating, through the processor of the data processing device, the environmental data generated through the one or more environmental sensors of the tracking device and the one or more environmental sensors of the second tracking device,
generating, through the processor of the data processing device, one or more views of the aggregated environmental data, the one or more views providing varying degrees of detail pertaining to at least one load of the first load and the second load.

31. The system of claim 30, further comprising:
wherein the memory of the tracking device comprises further instructions that when executed by the processor of the tracking device cause the tracking device to perform operations comprising:
generating an encrypted report comprising the environmental data generated by the tracking device, the encrypted report providing a user read-only access to the environmental data generated by the tracking device;
communicating the encrypted report to a remote data processing device communicatively coupled to the tracking device;
wherein the memory of the second tracking device comprises further instructions that when executed by the processor of the second tracking device cause the second tracking device to perform operations comprising:
wherein the memory of the data processing device comprises instructions that when executed by the processor of the data processing device cause the data processing device to perform operations comprising:
generating an encrypted report comprising the environmental data generated by the second tracking device, the encrypted report providing a user read-only access to the environmental data generated by the second tracking device; and communicating the encrypted report to the remote data processing device communicatively coupled to the second tracking device.

32. The system of claim 31, further comprising:
wherein the memory of the tracking device comprises further instructions that when executed by the processor of the tracking device cause the tracking device to perform operations comprising:
storing a hyperlink in a radio-frequency identification chip of the tracking device, the hyperlink providing a user access to the encrypted report generated by the tracking device; and
wherein the memory of the second tracking device comprises further instructions that when executed by the processor of the second tracking device cause the second tracking device to perform operations comprising:
storing a hyperlink in a radio-frequency identification chip of the second tracking device, the hyperlink providing a user access to the encrypted report generated by the second tracking device.

33. The system of claim 30, wherein a MAC address of the data processing device is associated with the aggregated environmental data.

34. The system of claim 30, wherein credentials of a user of the data processing device are associated with the aggregated environmental data.

* * * * *